(12) United States Patent
Hofele

(10) Patent No.: US 10,745,923 B2
(45) Date of Patent: Aug. 18, 2020

(54) MOISTURE VAPOR REDUCTION SYSTEM

(71) Applicant: Velosit GmbH & Co. KG, Horn-Bad Meinberg (DE)

(72) Inventor: Jens Hofele, Horn-Bad Meinberg (DE)

(73) Assignee: Velosit GmbH & Co. KG, Meinberg (DE)

(*) Notice: Subject to any disclaimer, the term of this patent is extended or adjusted under 35 U.S.C. 154(b) by 0 days.

(21) Appl. No.: 16/241,898

(22) Filed: Jan. 7, 2019

(65) Prior Publication Data
US 2020/0217086 A1 Jul. 9, 2020

(51) Int. Cl.
*E04F 15/18* (2006.01)
*B32B 27/08* (2006.01)

(52) U.S. Cl.
CPC ............ *E04F 15/182* (2013.01); *B32B 27/08* (2013.01); *B32B 2307/7246* (2013.01); *B32B 2471/00* (2013.01)

(58) Field of Classification Search
CPC ........... E04F 15/182; B32B 2307/7246; B32B 27/08; B32B 37/04; E02D 31/02; E04B 2/84; E04B 1/16
USPC ................. 52/746.1, 741.4; 156/71; 428/142
See application file for complete search history.

(56) References Cited

U.S. PATENT DOCUMENTS

| | | | | |
|---|---|---|---|---|
| 4,994,328 A * | 2/1991 | Cogliano | ................... | C09J 7/22 428/489 |
| 5,316,848 A * | 5/1994 | Bartlett | ................. | E01D 19/083 428/351 |
| 5,496,615 A * | 3/1996 | Bartlett | ...................... | C09J 7/02 428/144 |
| 5,968,630 A * | 10/1999 | Foster | ..................... | B32B 27/32 428/317.7 |
| 6,773,526 B2 * | 8/2004 | Phillips | ................... | E02D 31/02 156/71 |
| 2004/0031223 A1 * | 2/2004 | Durning | .................. | B32B 13/04 52/309.17 |
| 2005/0153093 A1 * | 7/2005 | Chang | ....................... | E04D 5/10 428/57 |
| 2005/0252133 A1 * | 11/2005 | Simonelli | ............ | E04B 1/0007 52/480 |
| 2016/0289953 A1 * | 10/2016 | Silvers | ..................... | B32B 5/022 |
| 2017/0151761 A1 * | 6/2017 | Segars | ...................... | B32B 5/06 |
| 2018/0223523 A1 * | 8/2018 | Koster | .................... | E04B 1/665 |
| 2019/0100925 A1 * | 4/2019 | Pucilowski | ........... | E04F 15/185 |

FOREIGN PATENT DOCUMENTS

EP            1630300 A1 *  3/2006  ............. E02D 31/02

* cited by examiner

*Primary Examiner* — Beth A Stephan
(74) *Attorney, Agent, or Firm* — Milstein Zhang & Wu LLC; Duan Wu, Esq.

(57) ABSTRACT

The moisture vapor reduction system of the present invention comprises of as a first component the special mineral adhesive, being a hydraulic mineral adhesive, which comprises filling materials selected from the group of mineral fillers and/or plastic fillers and further comprises a binding material composition selected from the group consisting of Portland cement clinker, calcium-sulfo-aluminate and mixtures thereof, combined with an excess of a sulfate providing agent and further comprises as a second component a cover, e.g. a sheet or foil, made out of a waterproof and/or vapor-retarding material.

8 Claims, 1 Drawing Sheet

MOISTURE VAPOR REDUCTION SYSTEM

BACKGROUND OF THE INVENTION

The present invention refers to a problem in the world of flooring, where billions of dollars are spend to protect floors, such as concrete slabs or concrete floors, with or without floor coatings, from migrating moisture or moisture vapor transmission.

Water is essentially needed as an ingredient in concrete preparations. However, in the lifespan of a concrete slab, a concrete wall or any other concrete structure liquid water and also water vapor can become destructive to said concrete structure.

Concrete is prepared with water for the hydration of cement. Remaining or superfluous water will be evaporating over the time. Accordingly, after sufficient time for drying a concrete slab contains no or very little water. Particularly, in air conditioned or de-humidified buildings a concrete slab can be considered dry.

However, concrete slabs are often installed or placed directly to the ground. Naturally, there is liquid water in the ground everywhere. Typically, the liquid ground water is bound to soil particles. Additionally, water vapor and moisture does occur in between soil particles or other materials. Such moisture or moisture vapor follows gradients and thus, has the capability to move from an area of high humidity to an area of lower humidity. Accordingly, as long as there is no functional and effective water/vapor barrier placed below the concrete slab, in such slabs, sooner or later, a moisture gradient will establish and as a consequence, vapor and moisture from the ground will migrate into the pores of the concrete slab and eventually accumulate in the slab. This migration of vapor and moisture—also called moisture vapor transmission—is a serious problem for the construction industry.

A known problem with concrete slabs without additional floor covering is that, although the moisture vapor may pass through the porous concrete and dry out again, the moisture transports various salts into or through the concrete. This causes efflorescence and will lead to exfoliation or flaking of paints or plaster due to the pressure of salt crystallization. It also might lead to fractural damage and/or mechanical instability of the surface due to volume expansion by salt crystallization.

Another well-known problem by moisture vapor relates to concrete slabs with additional floor covering. Typically, a flooring system installed on top of a concrete slab has a lower or no vapor permeability than the concrete itself. Thus, as the vapor cannot easily evaporate, the amount of vapor in the concrete slab will increase over time.

The relative humidity in the concrete and below flooring can be measured by Calcium Carbide-method according to ASTM F2170 or with a moisture meter. Due to the accumulation of vapor the humidity in the concrete slab rises, most, if not all, flooring materials can be damaged or at least will change its properties and characteristics. For example, wooden floors or wooden floor coverings can and eventually will expand and buckle if exposed to high or varying humidity over a longer period of time.

Another problem caused by the high humidity and moisture vapor in the concrete slab is the changing of the pH value at the surface of the concrete, where typically adhesives and other floor covering materials are installed. Where there are high or increasing amounts of moisture vapor accumulated in the concrete slab, there is also a high likelihood of a temperature-triggered condensation. Also temperature changes due to the operation of air conditioning or simply the surrounding weather conditions may lead to condensation of the moisture vapor and, thus, the formation of liquid water in the pores of the concrete slab. As described previously such liquid water will easily dissolve various salts. By such formation of hydroxides, the pH value increases in the concrete and particularly in the liquid water in the pores of the concrete. Typically, pH values are detected ranging from pH 12 to pH 14.

All known adhesives will be influenced and most likely degrade when exposed to such high pH values. Thus, the moisture present in the concrete causes substantial damages to the flooring. In its simplest way, such damage may be a changing of colors or a discoloring of the floor coverings. It may, however, also cause adhesion problems such as blistering, loosening or delaminating the floor coverings.

As problems arising from moisture vapor transmission are well known, many strategies and systems using various components have been suggested either to avoid or cure this problem.

One approach is known from DE 10 2004 040201, where moisture vapor transmission problems are avoided by placing a waterproof and water resistant barrier below the concrete or in between humidity-containing-materials and the concrete, thereby prohibiting the entrance and accumulation of any water or moisture vapor transmission into the concrete. Such modern solutions are, however, not always promoted, for cost or other reasons. Additionally, such solutions are particularly unhelpful for renovating projects, which have to deal with more traditional and non-waterproof constructions.

WO 95/10574, alternatively, suggests a waterproofing membrane comprising a carrier membrane made of PET, PVC or PE with adhesives on both sides. This membrane is constructed to be placed on the water-bearing—so called "positive"—side. It is intended to prevent water from getting in contact with the concrete. On this "positive" side the water pressure is higher than at the "negative" side and a moisture vapor gradient will build up from the positive towards the negative side. It is particularly worth noting that the adhesives suggested in WO 95/10574 cannot insure that the membrane stays attached to the concrete, especially when moisture vapor accumulates below said membrane.

A second approach to deal with moisture vapor transmission problems is to treat the upper surface of the concrete slab, thereby hindering the accumulation of water and, thus, a change in the pH value in said surface area of the concrete. If the surface area of the concrete is not affected by any pH change, then any adhesives placed on said surface also will not be affected and thus, will not likely show any loosening, blistery or delaminating of the flooring.

The state of the art suggests in U.S. Pat. No. 5,576,065 a liquid composition, which is applied to the concrete and forms an elastomeric and water repellent overcoat. Similarly, it is known to use a moisture vapor reduction system, which primes the concrete slab with an isolating material, which can be poured onto the concrete to prevent most of the vapor emission and to form a barrier protecting the flooring against pH changes or against blistering. Typically, such isolation materials are based on materials, such as epoxy-, PU- or MMA coatings. If applied to concrete, typically a minimum of 24-hour period is needed to allow proper setting and hardening before additional flooring can be added.

Alternatively, concrete can be sealed by administering and spreading so-called surface "hardeners", which are solutions containing typically silicate minerals such as sodium silicate or sometimes potassium silicate, and forming with the free-lime still present in the concrete a silicate mineral directly in the pores of the concrete slab. A concrete slab treated with such sealer, typically is denser and tighter, and thus reduces but never fully prevents moisture vapor transmission. If applied to concrete, a minimum of 48-hour is needed to allow proper setting and hardening before additional flooring can be added.

The main disadvantage of the existing moisture vapor reduction system is that—when the surface of the concrete slab is sealed or coated—any remaining water is just captured in the concrete below the sealed surface. Thus, even if for the moment the moisture vapor transmission rate is reduced, the water locked in the concrete still causes problems; these problems arise in the middle of the concrete slab and thus any deteriorating effect is just delayed.

Therefore, it is the object of the present invention to improve the disadvantages of the prior art and to provide a successful system for the reduction of moisture vapor. Such system for the reduction of moisture vapor should guarantee an effective avoidance of any deteriorating effects of moisture vapor in a concrete slab. Thus, it should particularly avoid efflorescence and the destabilizing effects of the salt crystallization on the concrete microstructure. It furthermore should avoid any accumulation or inclusion of free water in pores of the concrete slab and, particularly, in any pores or holes below the flooring, as only the complete avoidance of such accumulation of water or humidity and, thus, the avoidance of any pH change can guarantee a long life span of the floor covering without any loosening, delaminating, dissolving, discoloring or other deteriorating effects.

SUMMARY OF THE INVENTION

This object is achieved by the moisture vapor reduction system according to the claims, which is in its most simple embodiment characterized by installing to the negative side, the side whereto moisture would spread, of a concrete slab a waterproof layer, which is affixed to the concrete by a special mineral adhesive. The moisture vapor reduction system is particularly advantageous as the composition of the special mineral adhesive is unique and substantially improves the lifespan not only of the concrete itself, but particularly of any flooring placed onto said concrete slab treated with the moisture vapor reduction system of the present invention.

The moisture vapor reduction system according to the claims fully solves for the first time a long existing problem of builders, as for the first time a system is offered which does not only minimizes the moisture vapor transmission, but factually compensates and annulates any moisture vapor transmission and the accumulation of any free water in the concrete slab. Beside the complete avoidance of any deteriorating effects caused by moisture vapor, the system of the present invention is also advantageous as it is easy to handle, shows excellent workability, allows quick working performance and needs no prolonged hardening periods before a floor covering can be added.

The moisture vapor reduction system of the present invention comprises of, as one part, the special mineral adhesive being a hydraulic mineral adhesive, which comprises filling materials selected from the group of mineral fillers and/or plastic fillers and further comprises a binding material composition selected from the group consisting of Portland cement clinker, calcium-aluminate, calcium-sulfo-aluminate and mixtures thereof, combined with an excess of a soluble sulfate providing agent. Preferably, the invention uses calcium sulfate ($CaSO_4$) and/or sodium sulfate ($NaSO_4$) as soluble sulfate.

The moisture vapor reduction system comprises as a second part a vapor-retarding cover or membrane, e.g. a sheet or foil, made out of a waterproof and vapor-proof material.

According to the invention, the mineral adhesive is a composition with up to about 70, or even 80 to 95 wt % being components (i)-(iii), namely (i) being mineral and/or plastic fillers, (ii) being hydraulic binding materials, and (iii) being optional additives; and furthermore with up to about 5 to 20 or 30 wt % in component (iv), a soluble sulfate providing agent, e.g. $CaSO_4$ and/or $NaSO_4$.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. All publications and patent literature described herein are incorporated by reference in entirety to the extent permitted by applicable laws and regulations.

DETAILED DESCRIPTION OF THE INVENTION

Figure 1:
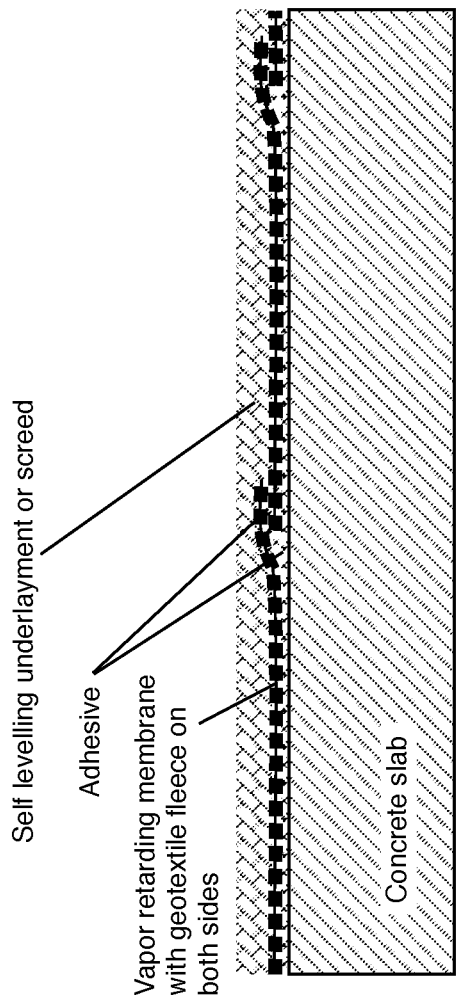
FIG. 1 shows the arrangement of a Moister Control System on a concrete slab, wherein sheets of a vapor retarding membrane are placed with overlapping edges/regions on a thin layer of mineral adhesive according to the invention. The system is then overlaid by a self-leveling screed or alternative underlayment for initiating further flooring constructions. In an embodiment, the vapor retarding membrane has geotextile fleece on both sides.
Figure 2:
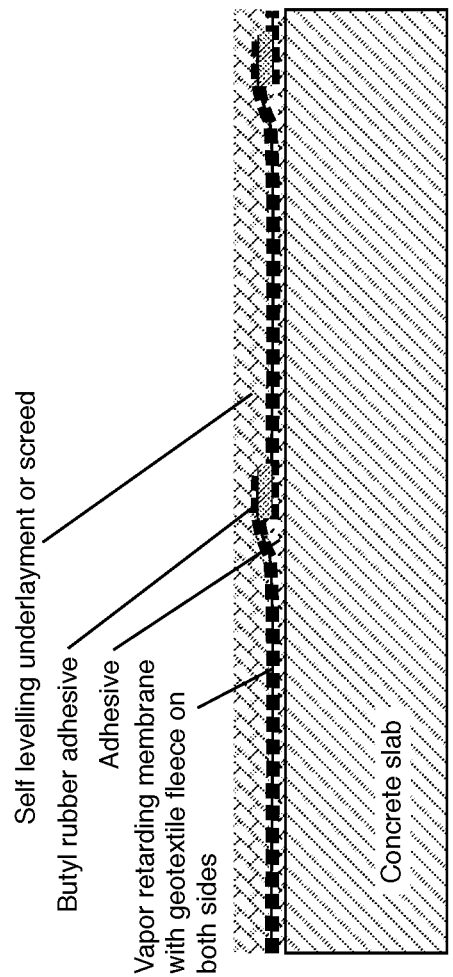
FIG. 2 shows the arrangement of the Moister Control System on a concrete slab, wherein a vapor retarding membrane is placed with overlapping edges/regions on a thin layer of mineral adhesive according to the invention. In this example, the overlapping regions are additionally tightened or otherwise bonded together through the use of a waterproof adhesive, e.g. a butyl rubber adhesive. The system is then overlaid by a self-leveling screed or alternative underlayment for initiating further flooring constructions. In an embodiment, the vapor retarding membrane has geotextile fleece on both sides.

According to the invention, the term "hydraulic binding materials" refers to a Portland cement clinker as well as the individual components thereof, such as calcium-sulfo-aluminate (CSA) or mixtures thereof. These materials are characterized by their chemical reaction, which is essentially based on a hydration reaction of calcium-sulfo-aluminate (CSA) with $CaSO_4$ to Ettringite:

$$C_4A_3S+8CSH_2+6CH+74H \text{à} 3C_6AS_3H_{32}$$

It is worth mentioning that the term "hydraulic" has in construction industry a very distinct meaning from its physical meaning. In construction industry the term "hydraulic" refers to water binding and water stable.

The composition of the present invention may contain as impurities or fillers also CaO- or $Ca(OH)_2$-comprising materials, e.g., cement or Portland cement. However, the term "hydraulic binding material" as referred to in the application is to be understood as referring in general to cement, Portland cement or a composite material containing silica, aluminum oxide, calcium oxide or calcium hydroxide as well as other hydraulic calcium silicates and ferric oxide, which mainly react in a hydration process.

According to the present application, the term "mineral adhesive" therefore refers to a composition, which comprises as main component a hydraulic binding material, and which is used to join or connect inorganic materials. Upon preparing an adhesive paste from the composition as claimed together with water, this composition starts to harden as a consequence of the hydration process of CSA with sulfate releasing materials and together with the comprised fillers or additives.

It is known that typically in the chemical reaction of $CSA+CaSO_4 \rightarrow Ettringite+Al(OH)_2$, as this hydration reaction is quite fast, long Ettringite needles are formed. These needles (pointed long crystals) influence the short term hardening behavior, but on the long term have a negative impact on the stability of the concrete.

According to the application, the term "mineral fillers" stands for all materials that can be described also as "mineral aggregate", or simply "aggregate". It comprises a broad category of coarse particulate material, including sand, limestone, quartz powder, calcite, gravel, crushed stone, slag, recycled concrete and geosynthetic aggregates and other known additives. Additionally, the term also and in particular comprises lightweight aggregates, such as clay, pumice, perlite and vermiculite.

Besides the definition of the material of the mineral fillers, according to the present invention, a size definition for the mineral fillers is also important. The mineral adhesive of the present invention is particularly suitable to treat preexisting concrete slabs, and thus, is typically prepared as a thin paste or even liquid emulsion suitable to be spread and able to plane out well into any unevenness of the surface or even to fulfill possibly existing holes, cracks or pores in the surface of the concrete. Accordingly, any mineral fillers used for the present invention should have an average grain size of about 0.06 to 0.250 mm, alternatively of about 0.120 to 0.200 mm or about 0.080 to 0.200 mm.

Typically, the average grain size and distribution of a grain size is evaluated in a standardized sieve analysis. The analysis is performed in nested columns of sieves by defining the percentage of remains on a sieve with a particular mesh size. The standardized method, the resulting grain size and grain category, the properties and the terminology regarding mineral fillers for concrete production are standardized and summarized in DIN EN 12620 and EN 13139.

The grain size as claimed promotes as a further advantage fast hardening. Additionally, thin paste or emulsion for treating a concrete slab prepared with the composition of the present invention shows excellent hardening and stability characteristics. They do have an excellent hardening profile and start to harden soon after they have been spread out over the concrete slab. Typically, the hardening process starts to be visible 15 min after preparing the paste or emulsion. Also important to note is that already 60 minutes after spreading out the claimed mineral adhesive over the concrete slab, the hardening is advanced in a way that it can be walked on and further work can progress. After 4 hours, the surface is fully stable and shows a compressive strength of 15 to 20 MPa.

In contrast, concrete mixtures according to the state of the art need a hardening time of at least 24 hours and reach typically a compressive strength of 20 MPa only after 24 hours.

According to the invention, the term "plastic fillers" stands for all materials that can be described also as polymers or monomers in a dispersed or powdery form. Additionally, plastic fillers could be added in a liquid form to the freshly prepared mineral adhesive. According to the application, the term "plastic fillers" comprises homopolymers, copolymers, polymer latexes selected from the group of silane, polyacrylic ester, vinyl esters, vinyl acetate, ethylene, acrylic acid esters, polyvinyl acetate, polyethylene vinyl acetate, styrene butadiene and mixtures thereof. Typically, the polymers interact with the hydrating cement and may retard the hydration. It is furthermore considered advantageous that a polymer-modified adhesive can improve water stability of the mixture and thereby also retards water permeation.

The term "soluble sulfate providing agent" according to the application describes materials that contain a sulfate group, which is reactive in concrete compositions. Typically, sulfate providing agents are $CaSO_4$, anhydrite, gypsum or mixtures thereof. The sulfate providing agents influence the setting and hardening time of the cement mixture. Any unbalanced amount of sulfate providing agent can lead to the formation of gypsum crystals and thus, hardening disorders. This is to be avoided as these gypsum crystals have a tendency to swell at the contact of water, and thereby become instable and cause an overall instability of the mineral adhesive.

Preferred compositions of the present invention consist of a mixture where the ratio of $CSA:CaSO_4$ is in the range of 2:1 to 6:1, preferably 4:1 to 6:1, further preferably is a ratio of 2.5:1, 3:1, 3.5:1, 3.75:1, 4.0:1, 4.2:1, 4.5:1, 4.7:1, 5:1, 5.2:1, 5.5:1, 5.75:1 or 6.0:1. It is believed without being bound by the theory that in this range the Ettringite as a result of the chemical reaction between CSA and $CaSO_4$ does form cubic crystals instead of needles, and thereby leads to a more stable and more dense consistency, which leads to the advantages of the present invention.

The term "additives" according to the present application comprises additives known by the skilled practitioner for the modulation of the mechanical properties of cement compositions or the resulting concrete. Typically, such additives are chemical admixtures for improving the anti-freezing properties, for reducing the expansion or shrinkage behavior, for improving the water-repellent characteristics, for avoiding foam, for changing or delaying the setting times of the cement mixture as well as many other properties. Preferred additives, without limiting the options, are according to the present invention selected e.g. from the group comprising potassium-sodium-tartrate, sodium tartrate, tartaric acid, potassium bitartrate, gluconic acid, gluconate, citric acid and citrate and mixtures thereof.

According to a further embodiment, the term "additives" is also understood to comprise water-soluble carbonates, which can be added to the composition of the mineral adhesive. Water-soluble carbonates according to the invention are for example selected from the group comprising $Na_2CO_3$, $K_2CO_3$ and mixtures thereof.

According to the invention, of at least one or more additives and/or one or more water-soluble carbonates are added to the composition of the mineral adhesive in an amount selected from the group of about 0.1 wt %, 0.5 wt %, 0.7 wt %, 1 wt %, 1.2 wt %, 1.5 wt %, 3 wt %, 3.5 wt %, 4.5 wt %, 5 wt %, 5.5 wt %, 6 wt %, 6.5 wt %, 7 wt %, 7.5 wt % or 8 wt %, or selected from the range of about 0.1-1.5 wt %, 0.1-4 wt %, 0.5-1.7 wt %, 0.5-4 wt %, 1-2 wt % and 1.5-3 wt %, 1.5-6 wt %, 1.5-8 wt %, of about 2.5-4.5 wt %, 3-5 wt % and 3.5-6 wt %, of about 4.5-6.5 wt %, 5-7 wt % or 5.5-8 wt %, and of about 6-7.5 wt % or 7-8.0 wt %.

The moisture and/or vapor reduction system of the invention further comprises a cover, e.g., a sheet or foil made out of a waterproof and/or vapor-retarding material. In this context, the term "water proof and/or vapor-retarding material" is understood to refer to all materials used for flexible sheets or foils, which are known to be waterproof or vapor proof. Such materials comprise thin metal foils such as aluminum foil and also comprise plastic foils or sheets made out of polypropylene, polyethylene, PVC, polyurethanes or other known mixtures thereof. Additionally, the term waterproof and/or vapor-retarding material also comprises textiles made out of e.g. polytetrafluoroethylene or other fluoropolymers.

According to a preferred embodiment, the waterproof or vapor-retarding sheet or foil is also addressed as "membrane." It is laminated on at least one side, but optionally on both sides. For laminating purposes, natural or polymeric textile fibers can be used, which are applied to or integrated into the foil or sheet. One embodiment uses geotextiles, i.e. woven, needled or preferably punched fabrics made from polypropylene. By laminating the foil or sheet the surface becomes rough and less slippery. A laminated foil or sheet thereby interacts better and closer with the mineral adhesive. Thus, the adhesion is improved and very stable. Additionally, when placing a laminated foil onto still water containing material, this foil will be able to stick and will not slip away. Thus, handling improves as the foil can be installed more accurately.

According to one embodiment of the invention, the composition of the mineral adhesive consists of a fast hardening hydraulic mineral adhesive comprising:

20 to 95 wt % of a hydraulic binding material selected from the group of Portland cement clinker, calcium-sulfoaluminate and mixtures thereof.

1.0 to 30.0 wt % soluble sulfate, e.g., but not limited to, $CaSO_4$;

1 to 10 wt % polymeric additives selected from the group of plastic fillers, silane, homopolymers and copolymers selected from the group consisting of vinyl esters, vinyl acetate, ethylene and/or acrylic acid esters;

0 to 70 wt % mineral additives selected from the group of mineral fillers, sand, lime stone, quartz powder and calcite wherein the average grain size of the mineral additives is not more than 250 μm;

0 to 4 wt % of at least one or more additives for the modulation of the mechanical properties of cement; and Portland cement as the balance, bringing the total to 100 wt %.

Alternatively, according to other embodiments of the invention, the compositions of the mineral adhesive contains varying ranges for one or more of the following:
(i) the hydraulic binding materials, wherein the composition contains about 10 to 40 wt % of the selected hydraulic binding material; alternatively, the composition contains about 15 to 35 wt % of the selected hydraulic binding material; alternatively, the composition contains about 18 to 32 wt % of the selected hydraulic binding material; alternatively, the composition contains about 20 to 40 wt % of the selected hydraulic binding material; alternatively, the composition contains about 25 to 35 wt % of the selected hydraulic binding material;
(ii) soluble sulfate providing agent, in the following defined—without limiting—as $CaSO_4$, wherein the composition contains about 1.0 to 30.0 wt % $CaSO_4$; alternatively, about 3.0 to 18.0 wt % $CaSO_4$; further alternatively, 4.0 to 22.0 wt % $CaSO_4$; alternatively, the composition contains about 3.5 to 6.0 wt % $CaSO_4$; alternatively, the composition contains about 4.5 to 7.0 wt % $CaSO_4$; alternatively, the composition contains about 5.0 to 8.0 wt % $CaSO_4$; alternatively, the composition contains about 4.0 to 9.0 wt % $CaSO_4$; further alternatively, 14.0 to 28.0 wt % $CaSO_4$; further alternatively, 10.0 to 25.0 wt % $CaSO_4$; and further alternatively, 6.0 to 9.5 wt % $CaSO_4$.

The composition of the present invention can be represented by any combination of the above ranges and according to the invention additionally contains mineral and/or plastic fillers in a range of 0.0 to 8.0 wt %, alternatively a range of 1.0 to 4.5 wt %, a range of about 2.0 to 5.0 wt %. Furthermore, the ranges of optionally contained additives may vary between about 1 wt % up to a maximum of 5 wt %. The additives for the modulation of the cement properties and/or water-soluble carbonates are added in an amount of about 0.5 wt %, 1 wt %, 1.5 wt %, 3 wt %, 3.5 wt %, 4.5 wt %, 5 wt %, 5.5 wt %, 6 wt %, 6.5 wt %, 7 wt %, 7.5 wt % or 8 wt %, or are added in an range selected from the following ranges 0.5-1.5 wt %, 1-2 wt % and 1.5-3 wt %, of about 2.5-4.5 wt %, 3-5 wt % and 3.5-6 wt %, of about 4.5-6.5 wt %, 5-7 wt % or 5.5-8 wt %, and of about 6-7.5 wt % or 7-8.0 wt %.

The balance to 100 wt % for any of the compositions according to the invention is provided by the addition of corresponding amount of Portland cement.

Exemplary Compositions

| Components | Comp1 % | Comp2 % | Comp3 % | Comp4 % | Comp5 % | Comp-StoA % |
|---|---|---|---|---|---|---|
| CSA | 60 | 40 | 60 | 40 | 60 | 20 |
| $CaSO_4$ | 20 | 15 | 15 | 10 | 20 | 8 |
| Calcite (mineral filler) | 13 | 20 | 13 | 20 | 13 | 13 |
| Polymer | 5 | 5 | 5 | 5 | 5 | |
| Soluble Carbonates | | 2 | 2 | 4 | | |
| Retarding additive | 0.3 | 0.2 | 0.4 | 0.4 | 0.6 | 0.3 |
| Defoaming additive | 0.1 | 0.1 | 0.1 | 0.1 | 0.1 | 0.1 |
| Add Portland cement to 100% | | | | | | |
| Initial Set (min) | 30 | 40 | 30 | 35 | 25 | 50 |
| Walkable after (h) | 1 | 2 | 1 | 2 | 1 | 4 |
| Adhesive Strength (MPa, 24 h) | 1.5 | 1.1 | 1.4 | 1.2 | 1.7 | 1.0 |
| Water permeability (kg/d) | 1.5 | 2.5 | 1.2 | 2.0 | 0.8 | 15 |

Portland cement is used for any of the above compositions to balance the composition to 100 wt %.

In comparison to known compositions (Comp-StoA) the above composition (Comp1 to 5) show, probably due to the formation of Ettringite crystals due to the excessive amount of $CaSO_4$ and CSA, a very fast initial setting time and allow fast progress in the workflow of adding additional flooring constructions as full walkability is found already after 60 to 120 min.

The initial setting time was measured with an Vicat Needle according to ASTM C191.

Interestingly, the compositions of the present invention show, after addition of hydrophobic and hydrophilic polymers, clearly improved results in the water permeability tests.

While open concrete allows water permeation and a passing through of about 15 kg water per day, the system of the present invention, when added to a concrete structure such as a slab, reduces this passing through rate by 80% and more. With a composition such as (Comp3 or Comp4) the amount of water permeation can be reduced to 2 kg/day or less.

The present application also refers to the method of installing the moisture vapor reduction system. For this, the hydraulic mineral adhesive according to the invention is prepared and mixed with water to become a thin paste or a viscous solution. This paste or solution is poured or spread to the concrete slab to be treated. The paste is typically spread until it has a thickness of (on average) 1-6 mm.

Immediately after application of the adhesive, the waterproof and/or vapor-retarding foil or sheet is placed into or onto the mineral adhesive.

If the foil or sheet is laminated on only one side, the laminated side is placed on the mineral adhesive. The foil or sheet is typically placed on the adhesive with an overlap of 3 to 7 cm along the edges.

While the foil or sheet is pressed into or onto the mineral adhesive, some of the adhesive is pressed into the overlapping area, where it will harden and thereby join two stretches of foil or sheet quite stable. Additionally, the mineral adhesive of the present invention can, given that soluble carbonates are included, additionally improve the vapor reduction as any water/vapor trying to defuse through this overlap of covers filled with mineral adhesive composition, will be bound in a hydration reaction and form $CaCO_3$, which strengthens the floor construction and thus the claimed vapor reduction system.

Alternatively, it will also be possible to adapt the vapor reduction system to the actual moisture vapor emission rate (MVER). As mentioned above, the overlaps of the membrane are the remaining main path for water/vapor release through the herein described system.

Accordingly, to improve the herein described system, the overlaps can be provided with an additional rapid curing adhesive for situations with an MVER of less than 12 lbs./24 h×1000 square foot. This additional rapid curing adhesive is applied to adhere the overlapping membrane for 75-100 mm with full coverage.

For higher MVER values, an alternative solution with a Butyl rubber adhesive strip on the overlaps secures a uniform vapor release all through the membrane. The system is especially suitable for applications on young concrete bodies if it is required to go earlier than the usual 28 days curing time. Other than the current state of technology, which uses an epoxy vapor barrier usually combined with sand broadcast, the solution outlined in this invention is able to compensate a significant degree of shrinkage of the underlying concrete.

In the following examples, which are not intended to limit the scope of the claimed invention, but only intend to illustrate said invention, it is shown that the composition of the mineral adhesive is particularly advantageous for the vapor reduction system.

Example 1

Fast Hardening Moisture Control Adhesive:
Portland cement CEM I 42.5R (Milke): 10.0%
CSA Clinker ALIPRE (Italcementi): 60.0%
Hemihydrate, snow white filler (USG): 15.0%
Elotex HD1501 (Elotex): 5.0%
Citric acid: 0.1%
Calcit FA14 (SH-Minerals): 9.9%

The mixture was blended together in a suitable Mixer for powder products making sure all components were fully dispersed.

The mixture was then mixed with 0.4-0.5 L water per kg adhesive. The product was applied with a notched trowel just before the membrane was installed.

Example 2

Moisture Control System 1:

For a system according to the invention, the membrane consisted of, e.g. a 1000 mm wide and 0.030 mm aluminum foil with a 50 g/sqm polyethylene geotextile adhered with a polyurethane adhesive. The geotextile on the upper side covered the right 950 mm of the aluminum foil. On the remaining 50 mm, a 0.1 mm butyl rubber with a wax paper was installed. The lower side had the right 50 mm of the aluminum foil just covered with the polyurethane adhesive, and the geotextile covered the remaining 950 mm.

The concrete slab to be treated was prepared by shotblasting before installation. The surface was pre-dampened and the adhesive as described above was installed with 4 mm notched trowel in 950 mm wide sections. The membrane as described above was laid into the fresh adhesive and flattened with a smoothing trowel by pushing the adhesive from right to left. Excess adhesive being squeezed out from below the membrane can be used for the next roll of membrane. After installing the first roll, another 950 mm of adhesive bed was applied as described above.

In the next step, the wax paper was removed from the butyl rubber and then the next roll was installed with by adhering the right 50 mm to the butyl strip and the geotextile again was flattened with a smoothing trowel into the adhesive bed.

The system reduced a vapor emission rate according to ASTM E 96 of 26 lbs./24 h×1000 sq. ft. to 1.4 lbs./24 h×1000 sq. ft. measured above the overlapping area of the two membrane sections.

A self-leveling underlayment or screed can be installed within 60 minutes after application of the membrane adhesive without priming directly onto the membrane. The minimum application thickness shall be at least 6 mm (¼ inch).

The system achieved at least 1.0 MPa (145 psi) adhesive strength on the substrate with the bond failure typically in the upper geotextile layer.

Example 3

Moisture Control System 2:

The membrane consisted of a 1000 mm wide and 0.140 mm polyethylene (PE) membrane with a 50 g/sqm PE geotextile coextruded on both sides.

The concrete slab to be treated was prepared by shotblasting before installation. The surface was pre-dampened and the adhesive as described above was installed with 4 mm notched trowel in 1000 mm wide areas. The membrane as described above was laid into the fresh adhesive and flattened with a smoothing trowel by pushing the adhesive from right to left. Excess adhesive being squeezed out from below the membrane could be used for the next roll of membrane.

After installing the first roll, another 1000 mm of adhesive bed was applied as described above beginning on the overlapping area on top of the first roll.

In the next step, the next roll of membrane was laid into the adhesive bed with an overlapping area/edge of 75 to 100 mm and again flattened with a smoothing trowel into the adhesive bed.

The system reduced a vapor emission rate according to ASTM E 96 of 12 lbs./24 h×1000 sq. ft. to 2.2 lbs./24 h×1000 sq. ft. measured above the overlapping area of the two membrane sections.

A self-leveling underlayment or screed could be installed with 60 minutes after application of the membrane adhesive without priming directly onto the membrane. The minimum application thickness shall be at least 6 mm (¼ inch).

The system achieved 0.7 MPa (100 psi) adhesive strength on the substrate with the bond failure typically in the upper membrane layer.

The invention claimed is:

1. A moisture vapor reduction system for installing on a concrete slab, the system consisting of:
   (a) a vapor-retarding membrane; and
   (b) a fast hardening hydraulic mineral adhesive comprising:
      70 to 95 wt % in components (i)-(iii), wherein (i) is mineral and/or plastic fillers, (ii) is a hydraulic binding material or Portland cement, and (iii) is optional additives; and further comprising
      5 to 30 wt % in component (iv), which is a soluble sulfate providing agent,
   wherein in use, the hydraulic mineral adhesive will be spread or poured on the concrete slab, and the vapor-retarding membrane will be placed or pressed onto the mineral adhesive on the concrete slab.

2. The moisture vapor reduction system according to claim 1 wherein the vapor-retarding membrane comprises a laminated waterproof or vapor-retarding material selected to be a sheet or foil.

3. The moisture vapor reduction system according to claim 1, wherein:
   (a) the vapor-retarding membrane comprises a laminated waterproof or vapor-retarding material selected to be a sheet or foil; and
   (b) the fast hardening hydraulic mineral adhesive comprises:
      20 to 95 wt % in a hydraulic binding material selected from the group consisting of Portland cement clinker, calcium-sulfo-aluminate and mixtures thereof,
      1 to 30 wt % in soluble sulfate selected from the group comprising $CaSO_4$,
      1 to 10 wt % in polymeric additives selected from the group consisting of plastic fillers, silane, homopolymers and copolymers that are, in turn, selected from the group consisting of vinyl esters, vinyl acetate, ethylene and acrylic acid esters;
      optionally, 0 to 70 wt % in mineral additives selected from the group of mineral fillers, sand, lime stone, quartz powder and calcite wherein the average grain size of the mineral additives is not more than 250 μm;
      0 to 4 wt % in at least one additive for the modulation of the mechanical properties of cement; and
      Portland cement as a balancing rest up to 100 wt %.

4. The moisture vapor reduction system according to claim 1, wherein the vapor-retarding membrane comprises a sheet or foil made of a waterproof and/or vapor-retarding material selected from the group consisting of metal, aluminum, plastic and polymeric materials based on polyethylene, polypropylene and/or polyvinyl chloride, polyurethanes, latex and/or rubber compositions, fluoropolymers, polytetraflouroetylen and mixtures thereof.

5. The moisture vapor reduction system according to claim 1, wherein the vapor-retarding membrane is laminated on at least one side or optionally on both sides with natural or textile fibers.

6. The moisture vapor reduction system according to claim 1, wherein the composition of the hydraulic material further comprises, between 0.1 to 8 wt %, additives selected from the group of soluble carbonates consisting of $Na_2CO_3$, $K_2CO_3$ and mixtures thereof.

7. The moisture vapor reduction system according to claim 1, wherein the composition of the hydraulic material consists of about:
   20 to 60 wt % in calcium-sulfo-aluminate;
   5 to 15 wt % in $CaSO_4$;
   0.1 to 4 wt % in at least one additive selected from the group consisting of $Na_2CO_3$, $K_2CO_3$ and mixtures thereof; and
   Portland cement as a balancing rest to 100 wt %.

8. The moisture vapor reduction system according to claim 1, the fast hardening hydraulic mineral adhesive consisting of 80 to 95 wt % in components (i)-(iii), wherein (i) is mineral and/or plastic fillers, (ii) is a hydraulic binding material, and (iii) is optional one or several additives; and which further consists of 5 to 20 wt % in component (iv), which is a soluble sulfate providing agent.

* * * * *